United States Patent
Cameron

(10) Patent No.: US 11,729,275 B2
(45) Date of Patent: Aug. 15, 2023

(54) METHODS AND SYSTEMS FOR AUTOMATIC INSTALLATION OF SOFTWARE APPLICATIONS FOR ONLINE STORES

(71) Applicant: Shopify Inc., Ottawa (CA)

(72) Inventor: David Cameron, Kitchener (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 16/923,814

(22) Filed: Jul. 8, 2020

(65) Prior Publication Data

US 2022/0014603 A1    Jan. 13, 2022

(51) Int. Cl.
*H04L 67/00* (2022.01)
*G06F 8/61* (2018.01)
*G06Q 30/0601* (2023.01)
*H04L 43/0817* (2022.01)
*H04L 67/51* (2022.01)

(52) U.S. Cl.
CPC ............ *H04L 67/34* (2013.01); *G06F 8/61* (2013.01); *G06Q 30/0601* (2013.01); *H04L 43/0817* (2013.01); *H04L 67/51* (2022.05)

(58) Field of Classification Search
CPC ..... H04L 67/34; H04L 43/0817; H04L 67/16; G06F 8/61; G06Q 30/0601
USPC ................................. 709/217, 223
See application file for complete search history.

(56) References Cited

U.S. PATENT DOCUMENTS

| | | | | |
|---|---|---|---|---|
| 6,981,252 | B1 * | 12/2005 | Sadowsky | G06F 8/62 717/176 |
| 7,155,462 | B1 * | 12/2006 | Singh | G06F 8/65 717/170 |
| 11,334,861 | B2 * | 5/2022 | Sanchez-Llorens | G06Q 20/204 |
| 2008/0243993 | A1 * | 10/2008 | Wang | H04L 29/12113 709/203 |
| 2012/0246630 | A1 * | 9/2012 | Kuzins | G06F 8/61 717/169 |
| 2012/0330699 | A1 * | 12/2012 | Allgaier | G06Q 10/00 705/7.11 |
| 2014/0137107 | A1 * | 5/2014 | Banerjee | G06F 1/3234 718/1 |
| 2015/0026323 | A1 * | 1/2015 | Peri | H04L 67/26 709/223 |
| 2019/0205166 | A1 * | 7/2019 | LaChiusa | G06F 9/54 |
| 2019/0306242 | A1 * | 10/2019 | Thummalapalli | H04L 41/0806 |

* cited by examiner

*Primary Examiner* — David R Lazaro
*Assistant Examiner* — Mariegeorges A Henry
(74) *Attorney, Agent, or Firm* — Ridout & Maybee LLP

(57) ABSTRACT

Methods and systems for automatic installation of applications against a service instance of an online store are described. A change in status of a service instance for the online store is detected. A functionality associated with the changed status is identified, where the functionality is currently absent from the service instance. A software application is identified to provide the functionality. The identified software application is automatically installed against the service instance, to enable the functionality for the online store.

20 Claims, 10 Drawing Sheets

FIG. 2

METHODS AND SYSTEMS FOR AUTOMATIC INSTALLATION OF SOFTWARE APPLICATIONS FOR ONLINE STORES

FIELD

The present disclosure is related to installation of software applications and, more particularly, to methods and systems for providing functionalities at a service instance of an online store via automatic installation of software applications related to the functionalities.

BACKGROUND

An e-commerce platform typically hosts many different online stores, providing services and functionalities to support typical operations of the online stores. In this sense, the e-commerce platform may play the role of a software as a service (SaaS) platform. Different online stores may have different needs or preferences for the functionalities provided by the e-commerce platform. As the number of functionalities developed for the e-commerce platform increases, it becomes inefficient to have all functionalities active for all online stores. For example, some functionalities may be useful for only a small number of stores, and it might be considered an inefficient use of resources to provide such functionalities for all online stores.

Further, some functionalities available on the e-commerce platform may be provided by a third-party service provider. Conventionally, when a third-party provided functionality is needed or desired for an online store, an administrator (e.g., a merchant) of the online store is usually directed to download the relevant application from the third-party service provider (e.g., via a separate portal).

SUMMARY

In various examples, the present disclosure describes methods and systems that enable automatic installation of an application when functionality provided by that application is required or desired by an instance of an online store. The application can be installed in the background, without explicit selection by a merchant associated with the online store and/or without notifying the merchant of the installation. Similarly, the application may be automatically uninstalled when the provided functionality is no longer required or desired. Conveniently in this way, functionalities for an online store may be more efficiently and/or more effectively enabled.

In some examples, the present disclosure describes a system including a processor in communication with storage. The processor is configured to execute instructions from the storage to cause the system to: detect a first change in status of a service instance for an online store from a first status to a second status; responsive to detecting the first change in status of the service instance, identify a functionality associated with the second status, the functionality being absent from the service instance; identify, from an application register, a software application comprising instructions for providing the functionality; and automatically install the identified software application against the service instance, to enable the functionality for the online store.

In some examples, the present disclosure describes a method including: detecting a first change in status of a service instance for an online store from a first status to a second status; responsive to detecting the first change in status of the service instance, identifying a functionality associated with the second status, the functionality being absent from the service instance; identifying, from an application register, a software application comprising instructions for providing the functionality; and automatically installing the identified software application against the service instance, to enable the functionality for the online store.

In some examples, the present disclosure describes a computer-readable medium storing instructions that, when executed by a processor of a system, cause the system to: detect a first change in status of a service instance for an online store from a first status to a second status; respective to detecting the first change in status of the service instance determine a functionality associated with the second status, the functionality being absent from the service instance; identify, from an application register, a software application comprising instructions for providing the functionality; and automatically install the identified software application against the service instance, to enable the functionality for the online store.

In any of the above, the first change in status may be detected based on a change in a setting of the online store from the first status to the second status.

In any of the above, the first change in status may be detected by: detecting an update to configuration data associated with the online store.

In any of the above, the functionality may be identified as being required to implement a change associated with the update to the configuration data associated with the online store.

In any of the above, the first change in status may be detected by: tracking operational data associated with the online store; and detecting the first change in status conditioned on the operational data satisfying a defined criteria for the second status.

In any of the above, satisfying the defined criteria may be a prerequisite for the online store to qualify for the functionality.

In any of the above, there may be further steps or instructions to: detect a second change in status of the service instance for the online store from the second status to a third status; determine that the functionality associated with the second status is not required in the third status; and uninstall the identified software application to disable the functionality from the online store.

In any of the above, there may be further steps or instructions to: provide a user-selectable option to select the functionality for uninstallation; and uninstall the identified software application in response to selection of the option.

In any of the above, the software application may be automatically installed by: communicating a request for the software application to a third-party system; receiving the software application from the third-party system; and installing the software application received from the third-party system.

BRIEF DESCRIPTION OF THE DRAWINGS

Reference will now be made, by way of example, to the accompanying drawings which show example embodiments of the present application, and in which:

FIG. 2 is an example homepage of an administrator, which may be accessed via the e-commerce platform of FIG. 1;

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussion is only for the purpose of illustration and is not intended to be limiting. Further, it should be understood that the present disclosure may be implemented in other contexts, and is not necessarily limited to implementation in an e-commerce platform.

Figure 1:
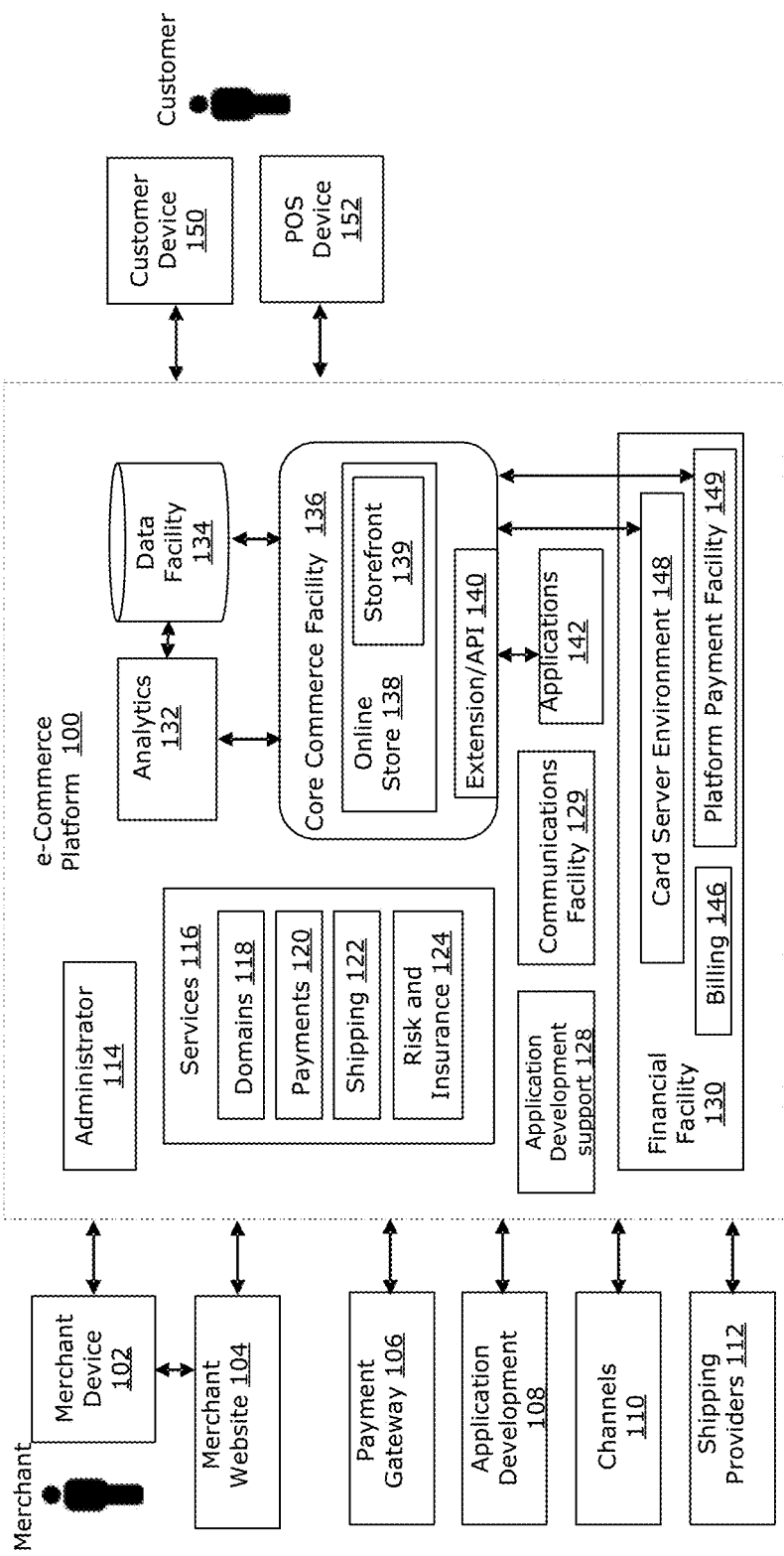
FIG. 1 is a block diagram of an example e-commerce platform, in which examples described herein may be implemented.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products or offerings. All references to products or offerings throughout this disclosure should also be understood to be references to products and/or services, including physical products, digital content, tickets, subscriptions, services to be provided, and the like.

While the disclosure throughout contemplates that a "merchant", a "user" and a "customer" may be more than individuals, for simplicity the description herein may generally refer to merchants, users and customers as such. All references to merchants, users and customers throughout this disclosure should also be understood to be references to groups of individuals, companies, corporations, computing entities, and the like, and may represent for-profit or not-for-profit exchange of products. Further, while the disclosure throughout refers to "merchants", and "customers", and describes their roles as such, it should be understood that merchants and customers may also be generally referred to as users of the e-commerce platform 100, and aspects of the e-commerce platform 100 may be more generally available to support users in an e-commerce environment. All references to merchants and customers throughout this disclosure should also be understood to be references to users, such as where a user is a merchant-user (e.g., a seller, retailer, wholesaler, or provider of products), or a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a corporate user may also be a customer.

The e-commerce platform 100 may provide a centralized system for providing merchants with online resources for managing their business. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example.

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices, and the like). In various embodiments, elements of the e-commerce platform 100 may be implemented to operate on various platforms and operating systems, such as iOS, Android, over the internet, and the like.

In various embodiments, storefronts 139 may be served by the e-commerce platform 100 to customers (e.g., via customer devices 150), where customers can browse and purchase the various products available (e.g., add them to a cart, purchase immediately through a buy-button, and the like). Storefronts 139 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their storefront 139. Merchants may customize the look and feel of their website through a theme system, such as where merchants can select and change the look and feel of their storefront 139 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 139 and/or website 104, such as through blogs, articles, and the like, as well as configure navigation menus. Merchants may upload images (e.g., for products), video, content, data, and the like to the e-commerce platform 100, such as for storage by the system. In various embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may provide business support services 116, an administrator component 114, and the like associated with running an on-line business, such as providing a domain service 118 associated with their online store, payments services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
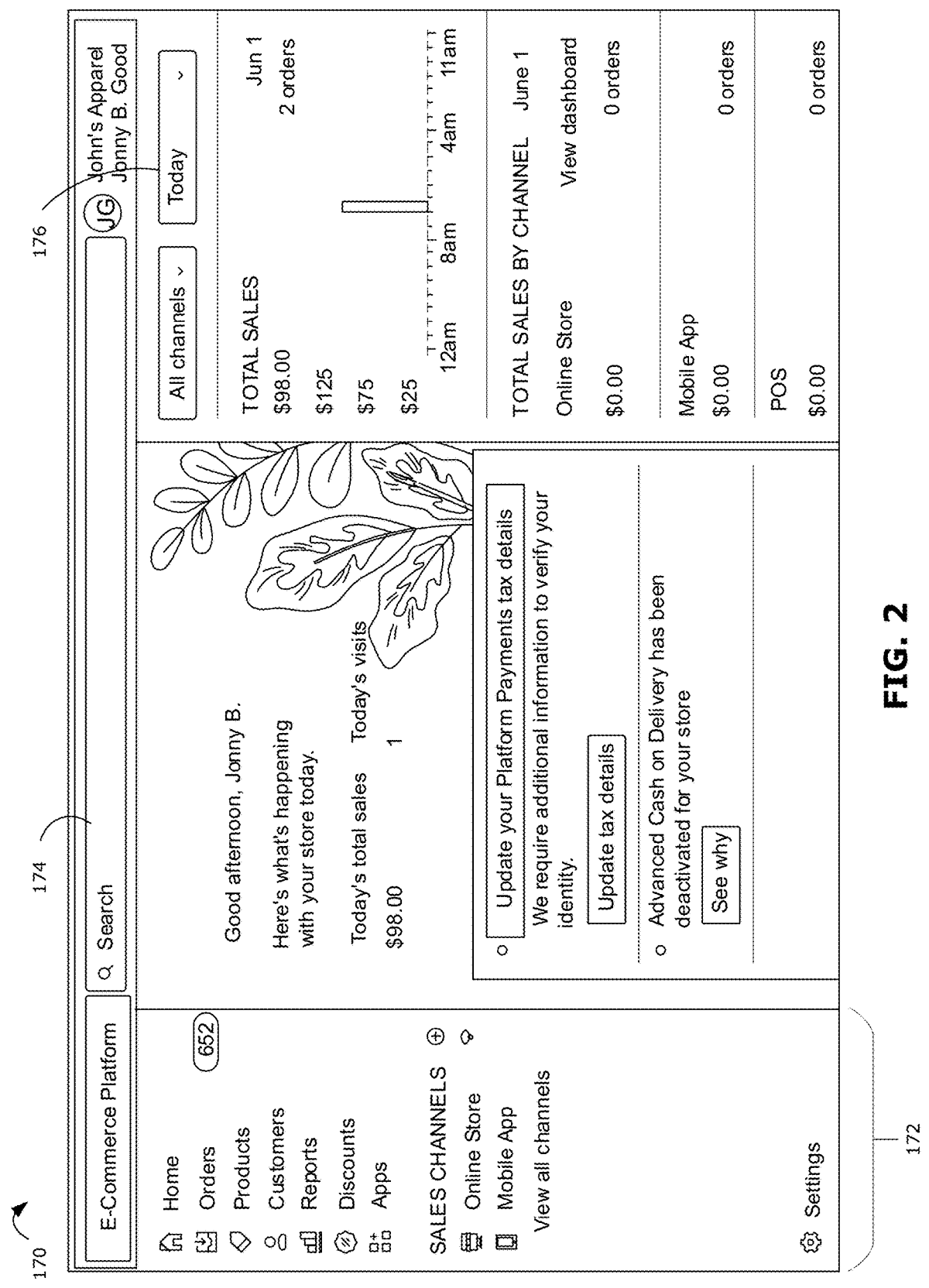

FIG. 2 depicts a non-limiting embodiment for a home page 170 of an administrator 114, which may show information about daily tasks, a store's recent activity, and the next steps a merchant can take to build their business. In various embodiments, a merchant may log in to administrator 114, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 114 by using the sidebar 172, such as shown on FIG. 2. Sections of the administrator may include core aspects of a merchant's business, including orders, products, and customers; sales channels, including the online store, POS, and buy button; applications installed on the merchant's account; settings applied to a merchant's storefront 139 and account. A merchant may use a search bar 174 to find products, pages, or other information. Depending on the device the merchant is using, they may be enabled for different functionality through the administrator 114. For instance, if a merchant logs in to the administrator 114 from a browser, they may be able to manage all aspects of their storefront 139. If the merchant logs in from their mobile device, they may be able to view all or a subset of the aspects of their storefront 139, such as viewing the storefront's recent activity, updating the storefront's catalog, managing orders, and the like.

More detailed information about commerce and visitors to a merchant's storefront 139 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's storefront 139, such as based on account status, growth, recent customer activity, and the like. Notifications may be provided to assist a merchant with navigating through a process, such as capturing a payment, marking an order as fulfilled, archiving an order that is complete, and the like.

Reference is made back to FIG. 1. The e-commerce platform may provide for a communications facility 129 and associated merchant interface for providing electronic communications and marketing, such as utilizing an electronic messaging aggregation facility (not shown) for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 130 for secure financial transactions with customers, such as through a secure card server environment 148. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 130 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In various embodiments, online store 138 may support a great number of independently administered storefronts 139 and process a large volume of transactional data on a daily basis for a variety of products. Transactional data may include customer contact information, billing information, shipping information, information on products purchased, information on services rendered, and any other information associated with business through the e-commerce platform 100. In various embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

In various embodiments, the e-commerce platform 100 may be configured with a core commerce facility 136 for content management and task automation to enable support and services to the plurality of storefronts 139 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting storefronts 139 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront 'isolation principle', where code should not be able to interact with multiple storefronts at a time, ensuring that storefronts cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, back-pressure to prevent degradation, and the like.

Although isolating storefront data is important to maintaining data privacy between storefronts 139 and merchants, there may be reasons for collecting and using cross-store data, such as for example, with an order risk assessment system or a platform payment facility, both of which require information from a majority of storefronts 139 to perform well. In various embodiments, rather than violating the isolation principle, it may be preferred to move these components out of the core commerce facility 136 and into their own infrastructure within the e-commerce platform 100. For example, the data facility 134 and analytics 132 may be located outside the core commerce facility 136.

In various embodiments, the e-commerce platform 100 may provide for a platform payment facility 149, which is another example of a component that utilizes data from the core commerce facility 138 but may be located outside so as to not violate the isolation principle. The platform payment facility 149 may allow customers interacting with storefronts 139 to have their payment information stored safely by the core commerce facility 136 such that they only have to enter it once. When a customer visits a different storefront 139, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 139. It would be difficult and error prone for each storefront 139 to be able to connect to any other storefront 139 to directly retrieve the payment information stored there. As a result, the platform payment facility 149 may be implemented external to the core commerce facility 136.

For those functions that are not included within the core commerce facility 138, applications 142 provide a way to add features to the e-commerce platform 100. Applications 142 may be able to access and modify data on a merchant's storefront 139, perform tasks through the administrator 114, create new flows for a merchant through a user interface (e.g., that is surfaced through extensions/API 140), and the like. Merchants may be enabled to discover and install applications 142 through application searching 208 and application recommendations 210 (see FIG. 3). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant and partner-facing products and services, such as may include, for example, application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 3:
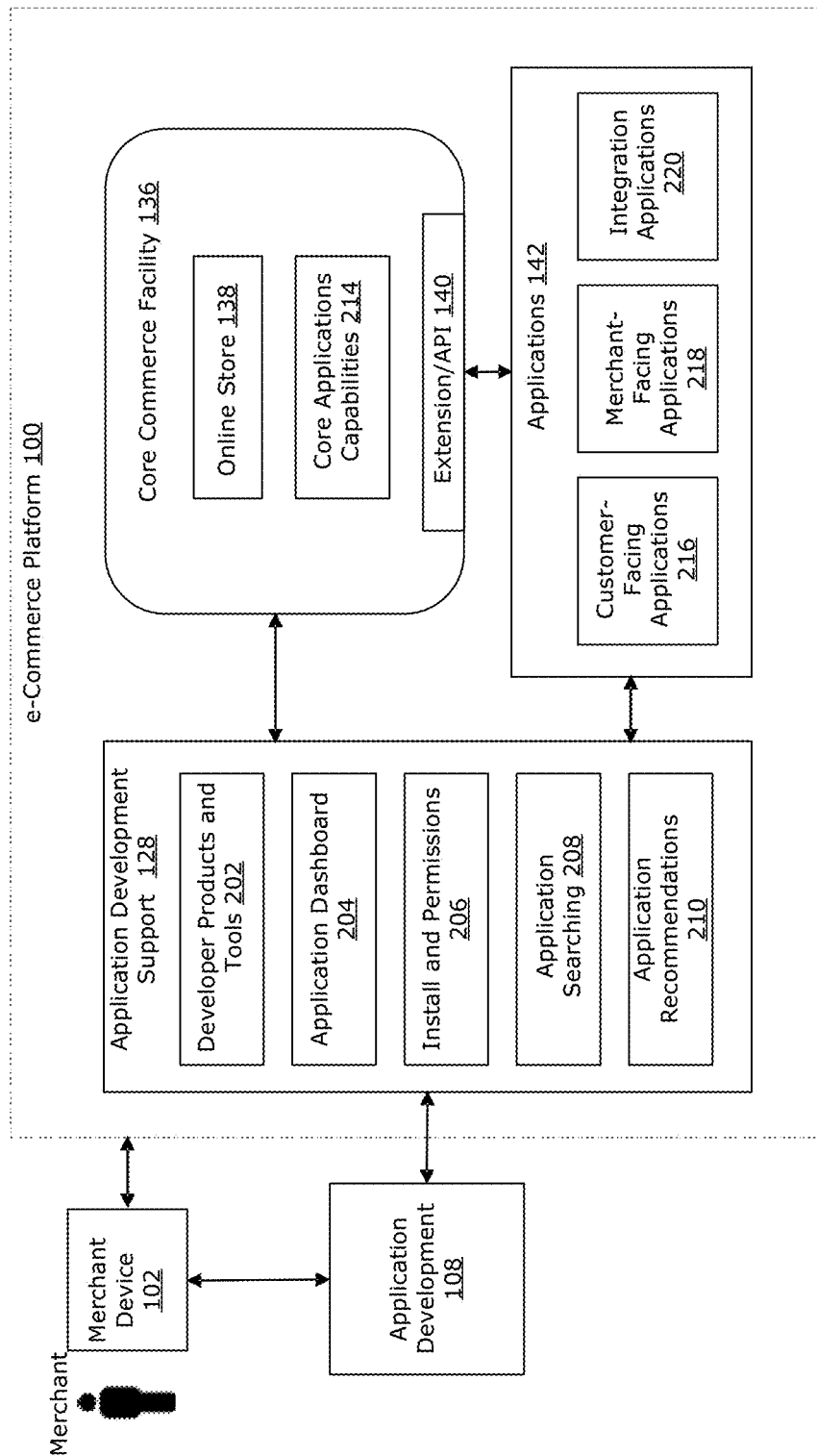
FIG. 3 is another block diagram of the e-commerce platform of FIG. 1, showing some details related to application development.

Reference is made to FIG. 3, which is another depiction of the e-commerce platform 100. FIG. 3 omits some details that have been described with reference to FIG. 1, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their storefront 139, application recommendations 210 to provide merchants with suggestions on how they can improve the user experience through their storefront 139, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include storefront 139 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their storefront 139 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online storefront 139. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 4:
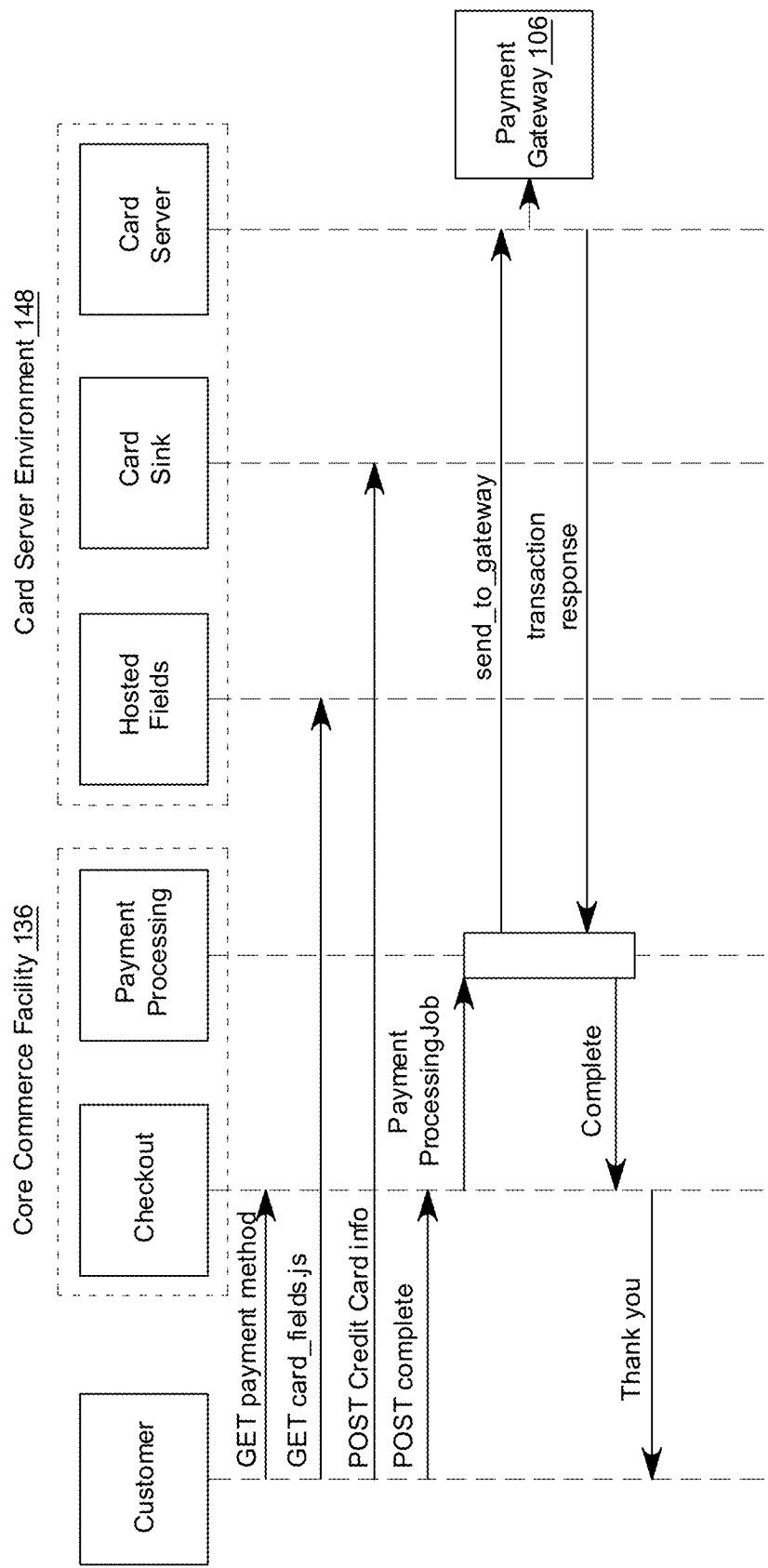
FIG. 4 shows an example data flow that may take place when a purchase is made using the e-commerce platform of FIG. 1.

FIG. 4 presents, in a non-limiting example, a simplified sequence diagram of the interactions between the core commerce facility 136 and the card server environment 148 during payment processing of a credit, prepaid, gift or other card on a Web Checkout.

In various embodiments, most of the process may be orchestrated by a payment processing job. The core commerce facility 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as tailored towards impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 100 may make the merchant aware of compliance issues with respect to legal obligations (e.g., with respect to taxes). In various embodiments, the e-commerce platform 100 may enable merchants to keep track of changes to the contract of sales over time, such as implemented through a sales model component (e.g., an append-only date-based ledger that records sale-related events that happened to an item).

Figure 5:
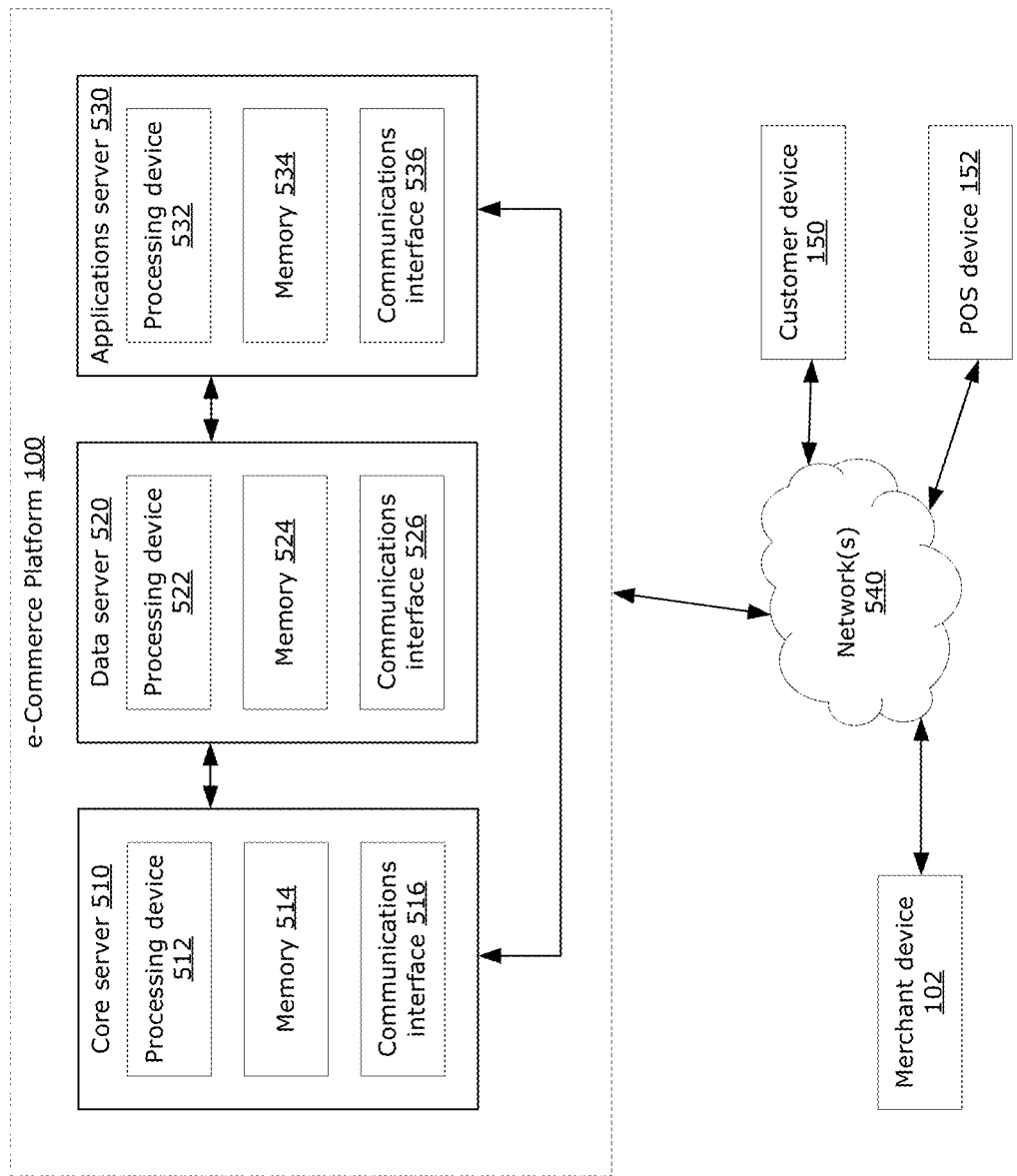
FIG. 5 is a block diagram illustrating an example implementation of the e-commerce platform of FIG. 1.

FIG. 5 is a block diagram of an example hardware configuration of the e-commerce platform 100. It should be noted that different components of the e-commerce platform 100 (e.g., the data facility 134, analytics facility 132, core commerce facility 136 and applications 142) may be implemented in separate hardware or software components, on a common hardware component or server or configured as a common (integrated) service or engine in the e-commerce platform 100. In the example of FIG. 5, the e-commerce platform 100 includes a core server 510, a data server 520 and an applications server 530, which are each in communication with each other (e.g., via wired connections and/or via wireless intranet connections). Each of the servers 510, 520, 530 include a respective processing device 512, 522, 532 (each of which may be, for example, a microprocessor, graphical processing unit, digital signal processor or other computational element), a respective memory 514, 524, 534 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 516, 526, 536 (each of which may include transmitter, receiver and/or transceiver for wired and/or wireless communications). The core server 510 may store instructions and perform operations relevant to core capabilities of the e-commerce platform, such as providing the administrator 114, analytics 132, core commerce facility 136, services 116 and/or financial facility 130, among others. The data server 520 may be used to implement the data facility 134, among others. The applications server 530 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 540 (e.g., wired and/or wireless networks, including a virtual private network (VPN), the Internet, and the like).

Although FIG. 5 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 514, 524, 534 may be replaced with external storage or cloud-based storage, among other possible modifications.

Figure 6:
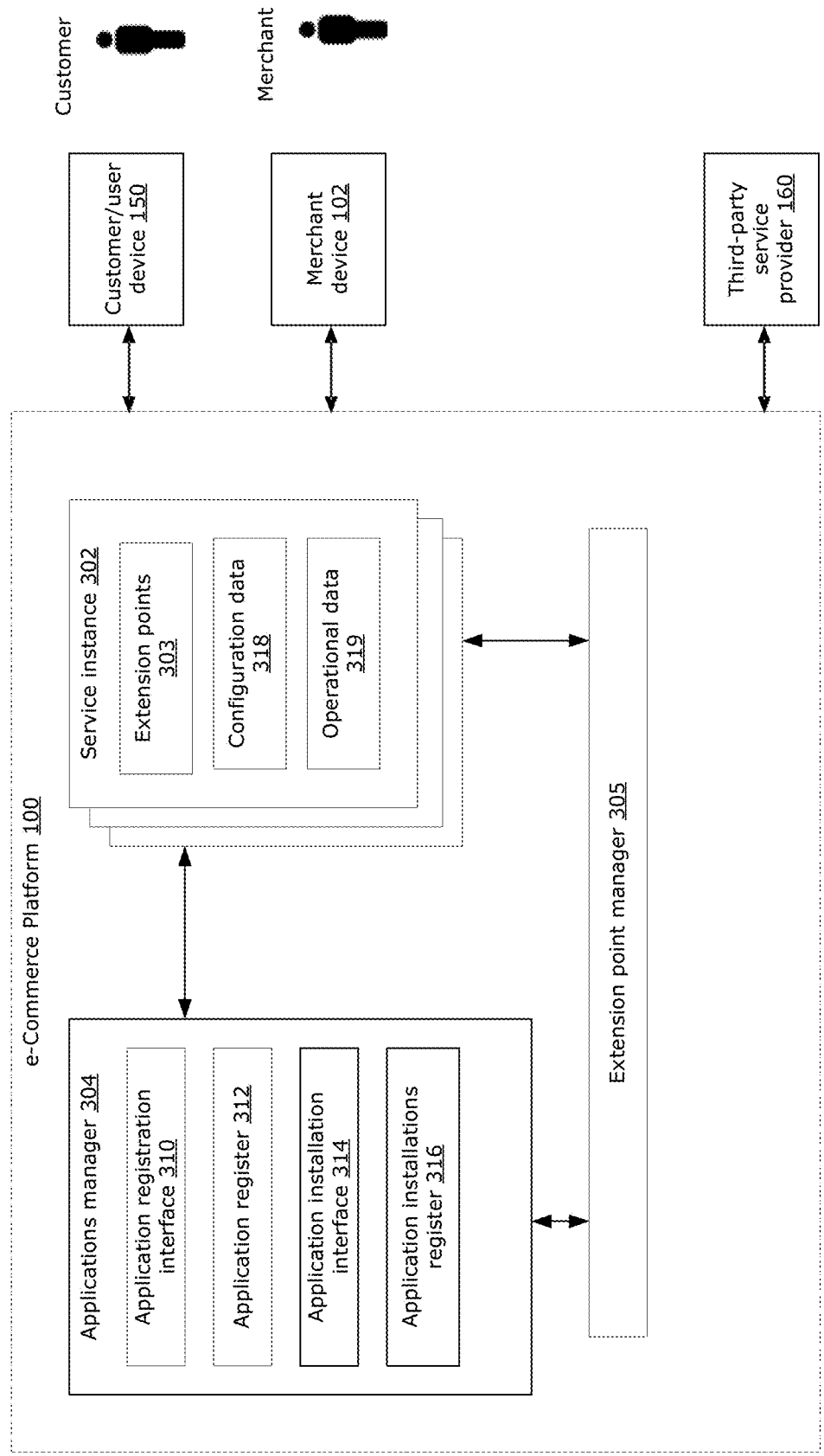
FIG. 6 is another block diagram of the e-commerce platform of FIG. 1, showing some details related to installation of applications against service instances for online stores.

FIG. 6 is another depiction of the e-commerce platform 100 that omits some details that have been described with reference to FIG. 1, and shows further details discussed below. In particular, FIG. 6 illustrates some example details of the e-commerce platform 100 that are relevant to its role as a SaaS platform.

Online stores 138 hosted on the e-commerce platform 100 may be implemented as service instances 302, each service instance being a set of functionality provided by the e-commerce platform 100 to a client (e.g., a merchant) of the e-commerce platform 100. A merchant may be associated with multiple service instances 302 (each corresponding to a respective online store 138, for example). Each service instance 302 may be identified by a respective service instance ID, which may be unique at least within the e-commerce platform 100.

The executable code that implements the service instances 302 includes one or more extension points 303. Extension points 303 are defined inside the e-commerce platform 100 to allow the customization of functionality of the e-commerce platform 100, and more specifically the service instances 302 (e.g., the online stores 138). Briefly, an extension point 303 defined in a service instance 302 enables connection to an application to provide a functionality that extends the overall functionality of the service instance 302. Each extension point 303 may have a specified format that includes defined inputs and outputs, and may be uniquely identified (at least within the e-commerce platform 100) using an extension point ID. An application may be developed to meet the defined inputs and outputs of an extension point 303, without having any further knowledge about the service instance 302. Similarly, a service instance 302 may make use of an application without having knowledge of the operation of that application, except the defined inputs and outputs at the extension point 303 connecting to that application. The use of extension points 303 thus enables modular customization of functionalities at a service instance 302.

An extension point 303 may connect to an application providing a desired or required functionality of the service instance 302. In this way, the extension point 303 may be considered to be associated with a certain functionality of the service instance 302. During execution of a service instance 302, the extension point 303 may be reached (or invoked) when the associated functionality is needed. For example, an extension point that may be relevant to the e-commerce context is an extension point which provides a shipping rate calculation functionality. A shipping rate calculation extension point may have an associated set of inputs which might for example include product details and shipping address, and has an associated set of outputs that includes a shipping rate. An extension point manager 305, described in further detail below, is responsible for determining how to proceed once an extension point is reached during execution of code for a service instance 302.

The e-commerce platform 100 includes an application manager 304, which may be used to manage applications that may be registered with the e-commerce platform 100. In the illustrated example, the application manager 304 includes an application registration interface 310 for registering an application with the e-commerce platform 100. For example, a third-party service provider 160 may register a third-party application with the e-commerce platform 100 using the application registration interface 310. First-party applications, which may be native to the e-commerce platform 100 (or developed by an operator of the e-commerce platform 100) may be automatically registered with the e-commerce platform 100 without having to use the application registration interface 310. The application manager 304 also includes an application register 312, which associates each registered application with a unique application ID. The application manager 304 includes an application installation interface 314 that may be used to select a registered application to be installed against a given service instance 302. The application installation interface 314 may be part of or accessible via a merchant user interface (e.g., via the administrator 114). For example, a home page 170 for managing an online store 138 may be used to access the application installation interface 314, in order to select one or more registered applications to install for the online store 138. The application manager 304 also includes an application installations register 316, which stores and maintains an indication of which application(s) are installed on (or registered against) which service instance(s) 302.

As previously mentioned, a third-party service provider 160 may develop applications which may be used on the e-commerce platform 100. The third-party service provider 160 may register third-party applications using the application registration interface 310. After a third-party application is registered, the application register 312 is updated to include an application ID (which is unique to the application, at least within the e-commerce platform 100) to indicate the application has been registered. A first-party application may be automatically included in the application register 312 after the application is developed and deployed by the operator of the e-commerce platform 100. After an application is registered with the platform 100 (and is included in the application register 312), the registered application is available for installation (or registration) against a service instance 302. For example, through the application installation interface 314, a merchant can select a given registered application to be installed against the merchant's service instance 302 (e.g., the online store associated with the merchant). After the given application has been successfully installed against the merchant's service instance 302, the application installations register 316 is updated to indicate that the given application has been installed for that service instance 302 (e.g., the application installations register 316 may record the application ID of the given application in association with a service instance ID of the service instance 302).

During the execution of a service instance 302, for example as a merchant or customer accesses an online store 138, the application(s) installed against the service instance 302 may be determined from the application installation register 316 (e.g., by looking up which application ID(s) are associated with the service instance ID of the service instance 302). When one of the extension points 303 is reached, the extension point manager 305 is invoked to determine how to proceed. The extension point manager 305 may store or access information that identifies which application(s) map to which extension point. For example, the extension point manager 305 may access information that associates each extension point ID with at least one application ID. In some examples, more than one application ID may be associated with a given extension point ID. For example, the set of inputs and set of outputs defined by the extension point associated with the given extension point ID may be satisfied by more than one application (meaning that more than one application has been developed to provide the functionality required at the extension point). The extension point manager 305 may also access the application installations register 316 to identify which application(s) are installed against the service instance 302. The extension point manager 305 uses the information in the application installations register 316 together with information mapping the extension point ID with application ID(s) to identify the application that should be executed when an extension point 303 is reached.

The identified application is then executed. For example, the extension point manager 305 may call the identified application through an API. The application may be executed on the e-commerce platform 100, or may be executed on an external server (e.g., a third-party server in the case where the identified application is a third-party application). The application performs its programmed operations and returns the result to the extension point manager 305. The extension point manager 305 in turn provides the result to the service instance 302.

Each service instance 302 is associated with a respective set of configuration data 318. The configuration data 318 includes information related to how the service instance 302 is set up. In the case of a service instance 302 for an online store 138, the configuration data 318 may include data related to, for example: number of warehouses, ship-from or ship-to locations, product pages, etc.

Each service instance 302 is also associated with a respective set of operational data 319. The operational data 319 may be different from the configuration data 318 in that operational data 319 provides information related to day-to-day actual operation, not its setup. In the case of a service instance 302 for an online store 138, the operational data 319 may include data related to, for example: inventory size or movement, current and historical number of customers, current and historical sales, current and historical marketing campaigns, etc.

Although the configuration data 318 and the operational data 319 are shown and have been described as separate sets of data, in some examples a single set of data associated with the service instance 302 may provide information related to both configuration and operation. The distinction between configuration data 318 and operational data 319 may not be strictly enforced, and may vary between implementations.

Different service instances 302 may have different setups and operational needs. As the number of applications included in the application register 312 increases, it becomes difficult if not impossible for a human user to be aware of available functionalities provided by the many different registered applications, and to identify which application should be installed against a particular service instance 302. As well, manually identifying and installing a desired application becomes inconvenient to a human user. The result may be that applications are unnecessarily installed against a service instance 302, which results in less efficient use of resources on the e-commerce platform 100. One or more of the foregoing may be addressed by the applications manager 304 in manners requiring little or no human intervention including as further described below.

The applications manager 304 performs operations, in response to a detected event, to automatically install an application against a given service instance 302. The trigger for causing automatic installation of an application may be detection of a defined user input or a defined event associated with the service instance 302. In the case where the service instance 302 is an online store 138, the defined user input may be a merchant action (e.g., explicit merchant selection of a desired functionality for an online store associated with the merchant) or a store event (e.g., a store event indicating a need for a new functionality), for example, the applications manager 304 may detect an event to trigger automatic installation of an application, based on data associated with the service instance 302 such as the configuration data 318 and/or the operational data 319.

The applications manager 304 may identify, from the configuration data 318 associated with a given service instance 302 and/or from the operational data 319 (as will be discussed further below), a change in status of the service instance 302. The changed status may be associated with a requirement (or recommendation) for a new functionality that is not currently installed (e.g., as indicated by the application installations register 316) for the given service instance 302. In accordance with examples described here, the applications manager 304 may automatically and transparently identify and install the appropriate application to provide required (or recommended) new functionality against the given service instance 302.

In this way, installation of an application (whether a first-party or a third-party provided application) may be completely transparent to a user (such as, for example, a merchant associated with an online store). A user may not be required to explicitly download and install the application against a service instance 302. In some examples, such as when the application provides a recommended but not required functionality, a user may be notified of the recommended functionality and given an option to approve or reject the installation of the application. The functionality of the service instance 302 may be thus tailored to the actual needs (e.g., based on configuration data 318 and/or operational data 319) of the service instance 302. The applications that are installed against each service instance 302 are only those that provide functionality actually required or desired by each service instance 302, rather than being indiscriminately installed. This may result in a more efficient usage of computing resources at the e-commerce platform 100 by freeing up resources that would otherwise be consumed by running applications for unused functionalities. From the user's viewpoint, the result is a more streamlined experience (e.g., requiring less explicit user input, faster running service instance 302).

Notably, automatic installation of applications may allow optional functionality to be seamlessly offered/provided as may have otherwise had to have been implemented in the core e-commerce platform directly in order to provide a seamless experience (e.g., an experience where the user does not have to manually install an application to gain access to corresponding functionality). Put another way, automatic installation of applications may allow functionality that is optional/only used by some users but for which a seamless experience is desired to be provided by way of one or more applications rather than in the core e-commerce platform directly. Conveniently, providing optional functionality by way of one or more applications as may be automatically installed rather than by implementing that functionality directly in the core e-commerce platform may have the effect of reducing the complexity of the core e-commerce platform in terms of its structure and/or the complexity of codebase thereof as compared to if that functionality was implemented/provided directly therein.

Figure 7:
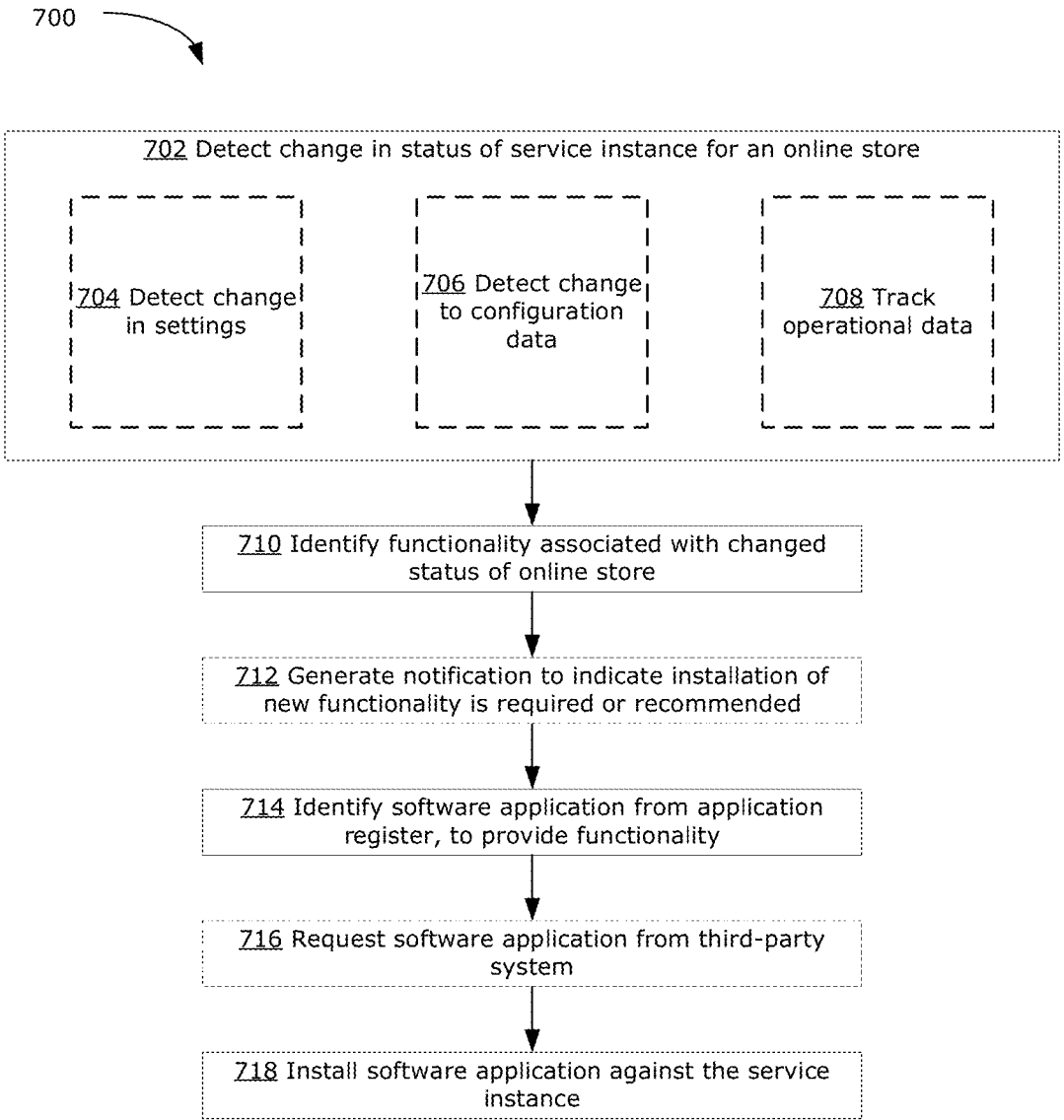
FIG. 7 is a flowchart illustrating an example method for automatically installing an application against a service instance for an online store.

FIG. 7 is a flowchart illustrating an example method 700 for automatic installation of a software application against a service instance 302 (e.g., an online store 138). The example method 700 may be performed by the e-commerce platform 100 (in its role as a SaaS platform), for example using the applications manager 304. The example method 700 will be described below in the context of an online store 138 hosted by the e-commerce platform 100. However, it should be understood that this is only for the purpose of illustration.

At an operation 702, a change in status of a service instance 302 for an online store 138 is detected. As depicted in FIG. 7 through the use of stippled lines, one or more optional operations may be employed, alone or in combination, in order to detect a change in the status of the service instance 302. More particularly, as shown in FIG. 7, the change in status (e.g., from a first status to a second status) may be detected at the operation 702 such as, for example, by employing one or more of the operations 704, 706 and/or 708 further described below.

For example, at operation 704, change in a setting of the online store may be detected. The change may be due/responsive to received user input indicating a change in settings associated with the online store 138. A merchant may, for example using an interface such as the homepage 170 of an administrator (see FIG. 2, for example), select a setting to explicitly activate or request a functionality for the online store 138. This user input may be identified as input to change the status of the online store 138.

In another example, at operation 706, a change to the configuration data 318 associated with the online store 138 may be detected. The change to the configuration data 318 may be a change to any of the information previously described with respect to the configuration data 318. For example, a change to the configuration data 318 may be automatically reported to or detected by the applications manager 304, using any suitable technique (e.g., by checking timestamps stored in the configuration data 318). This change to the configuration data 318 may be determined to cause a change to the status of the online store 138. The changed configuration for the online store 138 may require a new functionality for the online store 138. A change to the configuration data 318 may be caused by user input (e.g., a merchant selecting a higher level of data sharing); however, the user input to change the configuration data 318 may not explicitly indicate a required or desired functionality for the online store 138, unlike the change in settings described above at operation 704.

In another example, at operation 708, a change to the status of the online store 138 may be detected by tracking the operational data 319 associated with the online store 138. Conditioned on/responsive to the operational data 319 satisfying a defined criteria (e.g., the inventory size associated with the online store 138 exceeds a defined threshold), the online store 138 may be determined to be eligible for a new functionality. For example, a defined rule may be used by the applications manager 304 to track whether the operational data 319 of the online store 138 satisfies a defined criteria, where satisfying the defined criteria is a prerequisite for the online store 138 to qualify for a new functionality. Operation 708 may not involve any input from a merchant associated with the online store 138. In particular, the online store 138 may be considered to qualify for a new functionality not only based on current operational data 319, but may also be based on expected future operational data 319 (e.g., based on a projected trend of operational data 319). Thus, a new functionality may be recommended for an online store 138 in anticipation of an expected future need.

Example operations 704, 706 and 708 illustrate some techniques by which the applications manager 304 may detect a change in status of the service instance 302 for the online store 138. The operations 704, 706, 708 may be performed separately or in any combination. It should be understood that other techniques may be used, in addition to or instead of the operations 704, 706, 708.

However the operation 702 is implemented, following the operation 702, an operation 710 is next.

At the operation 710, a new functionality associated with the changed status (i.e., the second status) of the online store 138 is identified. For example, the applications manager 304 may store defined rules or other logic that identifies one or more functionalities for the second status of the online store 138. The applications manager 304 may determine from the application installations register 316 that the online store 138 currently does not have a functionality that has been identified for the second status. The new functionality may be identified as/determined to be a required functionality (e.g., the functionality is required for implementation of a selected setting for the online store 138), or a recommended functionality (e.g., the functionality is recommended for improved operation of the online store 138, based on the store's configuration data 318 or operational data 319).

Optionally, at the operation 712, a notification may be generated to indicate that installation of the identified new functionality is required or recommended. The notification may be generated by the applications manager 304 and may be displayed to a merchant associated with the online store 138 (e.g., displayed via the merchant device 102). The notification may include a selectable option to confirm installation of the new functionality or to reject the installation. In some examples, if the installation is rejected and the new functionality is required for implementation of a selected setting or configuration for the online store 138, then that setting or configuration may be automatically undone (e.g., automatic reversion to a previous version of the configuration data 318 associated with the online store 138). In some examples, the notification may only be generated if the identified new functionality is a recommended new functionality; no notification may be generated for a required new functionality.

In some examples, the notification generated at the operation 712 may be presented to the merchant as part of a homepage 170 of an administrator 114 (e.g., see FIG. 2), rather than as a standalone notification. For example, the notification may indicate that a new functionality is available for the online store 138, and the homepage 170 may include a new selectable option to enable the new functionality. In other examples, the homepage 170 may be updated to include the new selectable option to enable the new functionality, without informing the merchant that the new functionality is available.

At the operation 714, a software application is identified (e.g., from the application register 312) to provide the new functionality. The software application may be a first-party application or a third-party application, and the software application comprises instructions configured to provide the new functionality. The applications manager 304 may have determined, using the application installation register 316, that the identified software application has not been installed against the service instance 302 of the online store 138.

Optionally, at the operation 716, if the identified software application is a third-party application and the application has not yet been registered (e.g., does not have an entry in the application register 312), the applications manager 304 may communicate a request to the third-party service provider 160. The request may, for example, be automatically initiated by the applications manager 304, without requiring human intervention. The requested software application is then received from the third-party service provider 160. The communication between the e-commerce platform 100 (using the applications manager 304) and the third-party service provider 160 involves exchange of information between the e-commerce platform 100 and the third-party service provider 160 to enable the identified software application to be verified and/or authenticated by the e-commerce platform 100 and to be registered in the application register 312.

At the operation 718, the identified software application is installed against the service instance 302 for the online store 138. The application installations register 316 is also updated to reflect the newly installed software application for the service instance 302 of the online store 138. Automatic installation of the software application may not require use of the application installation interface 314, for example. After the software application has been installed, the new functionality is enabled for the online store 138.

As discussed above, a change in status of the service instance 302 of the online store 138 may be detected based on a change in settings (e.g., at operation 704), or based on a change in the configuration data 318 associated with the online store 138 (e.g., at operation 706). Some examples are now described.

Figure 8:
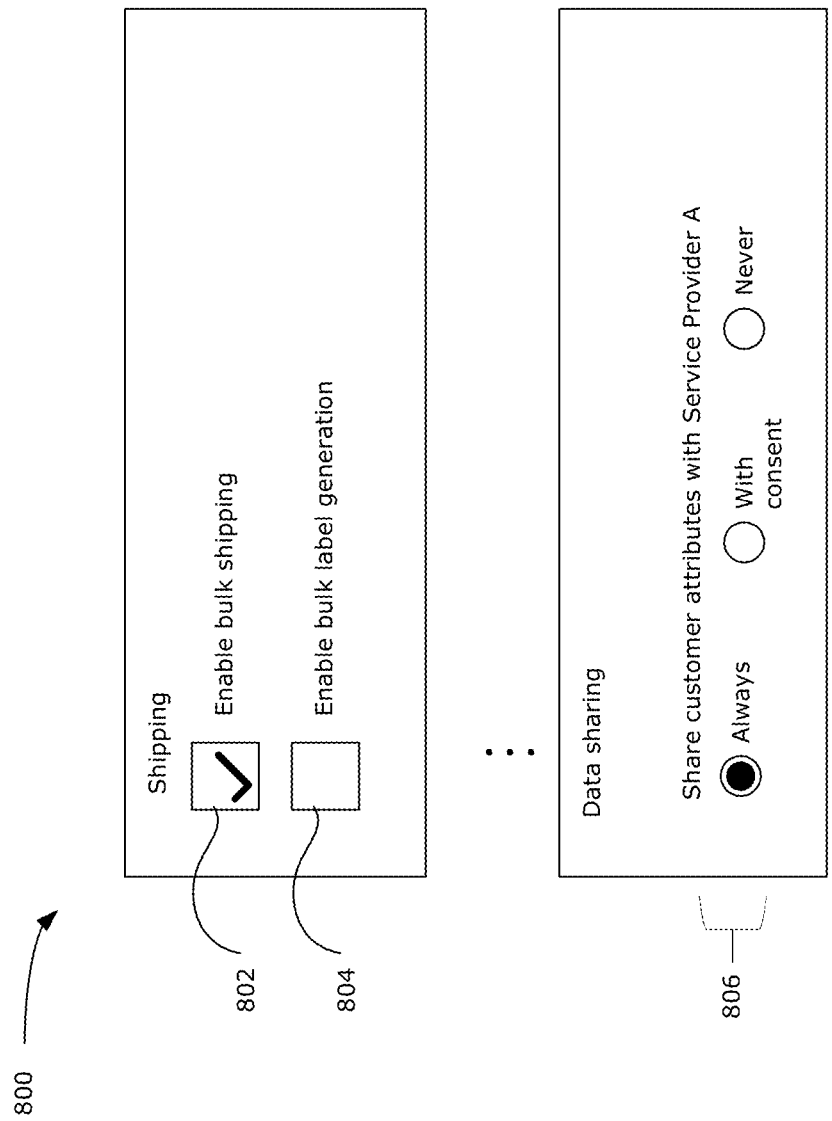
FIG. 8 illustrates an example user interface that may be used to manage settings and configurations for an online store.

FIG. 8 illustrates an example user interface (UI) 800 that may be used to manage the settings and configuration data 318 associated with a service instance 302, in particular in the example where the service instance 302 is an online store 138 hosted by the e-commerce platform 100. The UI 800 may be generated by the e-commerce platform 100 to be presented on a merchant device 102, for example. In some implementations, the example UI 800 may be presented as part of the sidebar 172 of a home page 170 of an administrator 114 (e.g., see FIG. 2), or may be accessible via a selectable option presented in the sidebar 172.

The example UI 800 provides a list of available functionalities (in this example, functionalities related to shipping), each of which may be selectively activated. In the example shown, an option 802 to enable a bulk shipping functionality is selected and another option 804 to enable a bulk label generation functionality is not selected. The options 802, 804 may both be unselected by default. When the option 802 is selected (e.g., by a merchant interacting with the merchant device 102), this may be detected by the application manager 304 as input indicating a change in settings that causes a change in status of the online store 138 (e.g., as described with respect to step 704 above). The software application that provides the bulk shipping functionality may be automatically identified and installed against the service instance 302 of the online store 138 (e.g., using the method 700). Another software application that provides the bulk label generation functionality is not installed against the service instance 302 of the online store 138.

In some examples, selection of an option to activate one functionality may make available a new selectable option (or a new sub-option) to activate a related functionality. For example, a merchant may select an option to enable a bulk shipping functionality, which may cause a new selectable option to become available to enable a bulk label generation functionality. In this way, dependencies between functionality may be enforced by the UI 800.

The example UI 800 also provides options for various settings that may be associated with various functionalities. In the example shown, options 806 are provided to control sharing of user data with Service Provider A for different levels of data sharing (e.g., never share, only share with explicit user consent, or always share). Selection of a setting of "always" or "with consent" may be detected (by the applications manager 304) as a change to the configuration data 318 that causes a change in status of the online store 138 (e.g., as described with respect to step 706 above). The applications manager 304 may accordingly determine that a data collection functionality is required for the service instance 302 of the online store 138, and may automatically install the corresponding third-party software application against the service instance 302 of the online store 138 (e.g., using the method 700).

The example UI 800 illustrates how applications may be automatically identified and installed against a service instance 302 for the online store 138, to enable a required functionality. The merchant does not need to explicitly identify and download an application to enable a desired functionality. The process may be seamless and transparent to the merchant. Enabling a new functionality for the online store 138 may thus be a similar experience to selecting an option in a sidebar menu.

In some examples, as discussed above, a change in status of the service instance 302 of the online store 138 may be determined based on operational data 319 associated with the online store 138. Some examples are now described.

The applications manager 304 on the e-commerce platform 100 may be able to track operational data 319 associated with a service instance 302 for an online store 138 that is hosted on the e-commerce platform 100. Operational data 319 may indicate a store event that changes the status of the service instance 302 for the online store 138. A store event may include, for example: an inventory event (e.g., change in inventory size/movement), a sales event (e.g., significant sales increase/decrease), a marketing event (e.g., initiation of a flash sale), a store change/update (e.g., addition of new warehouse location or new product), among other possibilities. The applications manager 304 may use defined criteria to define what change in the operational data 319 indicates a store event that changes the status of the online store 138 (e.g., at step 708 described above). The defined criteria may be defined by an operator of the e-commerce platform 100, or by a service provider (e.g., first-party or third-party service provider) providing the relevant functionality.

Some example defined criteria are now described. In an example, the operational data 319 may need to indicate an inventory size or sales volume that satisfies a defined threshold, in order for the applications manager 304 to determine that the status of the online store 138 has changed and that an application for a functionality related to bulk order fulfillment (e.g., a bulk label generation functionality, a bulk pick list generation functionality, a warehouse management functionality, etc.) should be automatically installed.

In another example, the operational data 319 may indicate that a flash sale is being initiated (e.g., creation of a new marketing campaign event) for a particular product. This may satisfy a criteria to automatically install an application that provides a flash sales functionality. The flash sales functionality may be a functionality to enable configuration of flash sales parameters (e.g., duration of sale, maximum number of items permitted per customer, enabling bot detection, etc.).

In another example, the operational data 319 may indicate that a new product page has been created for the online store 138, where the new product page includes a file for a 3D model. The uploading of the file for the 3D model (e.g., detected based on the file format of the uploaded file) may satisfy a criteria to cause automatic identification and installation of an application that provides 3D rendering functionality.

In some examples, the applications manager 304 may also perform operations to automatically identify an application as a candidate for uninstallation from the service instance 302 of an online store 138. The identified application may also be automatically uninstalled in the background, without requiring human intervention. Generally, the criteria that may be used by the applications manager 304 to identify a candidate for uninstallation may be opposite to the criteria for identifying a functionality or application to be installed against the service instance 302 for the online store 138.

Figure 9:
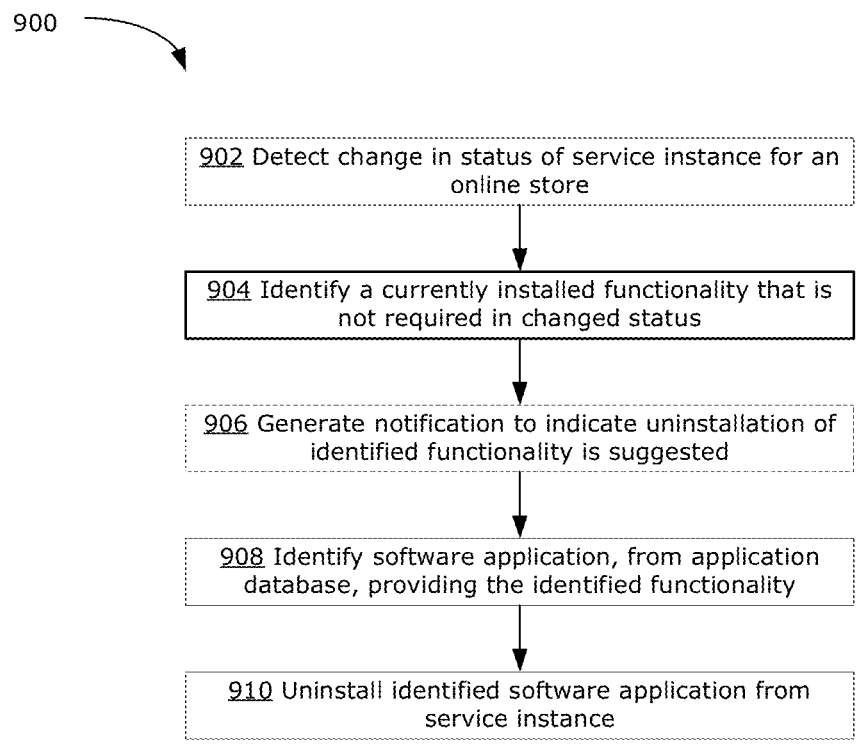
FIG. 9 is a flowchart illustrating an example method for automatically uninstalling an application from a service instance for an online store.

FIG. 9 is a flowchart illustrating an example method 900 for automatic uninstallation of a software application against a service instance 302 (e.g., an online store 138). The example method 900 may be performed by the e-commerce platform 100 (in its role as a SaaS platform), for example using the applications manager 304. The example method 900 will be described below in the context of an online store 138 hosted by the e-commerce platform 100. However, it should be understood that this is only for the purpose of illustration.

At the operation 902, a change in status of a service instance 302 for an online store 138 is detected. The change in status (e.g., from a second status to a third status) may be detected in various ways, for example using techniques similar to those described above with respect to operations 704, 706 and 708. For example, a change in settings associated with the online store 138 may be detected. In another example, a change to the configuration data 318 associated with the online store 138 may be detected. In another example, a change to the status of the online store 138 may be detected by tracking the operational data 319 associated with the online store 138. In some examples, a UI such as the UI 800 of FIG. 8 may be used by a merchant to change the settings and/or configuration data 318 associated with the online store 138, which change may be detected as a change in status of the online store 138.

At operation 904, a currently installed functionality that is not required for the changed status (i.e., the third status) of the online store 138 is identified. For example, the applications manager 304 may store defined rules or other logic that identifies one or more functionalities for the third status of the online store 138. The applications manager 304 may determine from the application installations register 316 that the online store 138 currently has a functionality that is not required (or not permitted) when the online store 138 is in the third status. The identified functionality may be determined as a functionality that is recommended to be uninstalled (e.g., uninstallation of a no longer needed functionality is recommended in order to release computational resources), or may be determined as a functionality that is required to be uninstalled (e.g., the online store 138 no longer satisfies an eligibility criteria for enabling the functionality), or a recommended functionality (e.g., the functionality is recommended for improved operation of the online store 138, based on the store's configuration data 318 or operational data 319). In particular, a functionality may be identified as a candidate for uninstallation not only based on current low usage (or non-use) of the functionality, but may also be based on expected future low usage (or expected future non-user) of the functionality (e.g., based on projected trend of operational data 319).

Optionally, at operation 906, a notification may be generated to indicate that uninstallation of the identified functionality is required or recommended. The notification may be generated by the applications manager 304 and may be displayed to a merchant associated with the online store 138 (e.g., displayed via the merchant device 102). The notification may include a selectable option to confirm uninstallation of the identified functionality or to reject the uninstallation. In some examples, if uninstallation is required, the notification may not include any option to reject the uninstallation. In some examples, the notification may only be generated if uninstallation of the identified functionality is recommended; no notification may be generated if uninstallation of the identified functionality is required.

Figure 10:
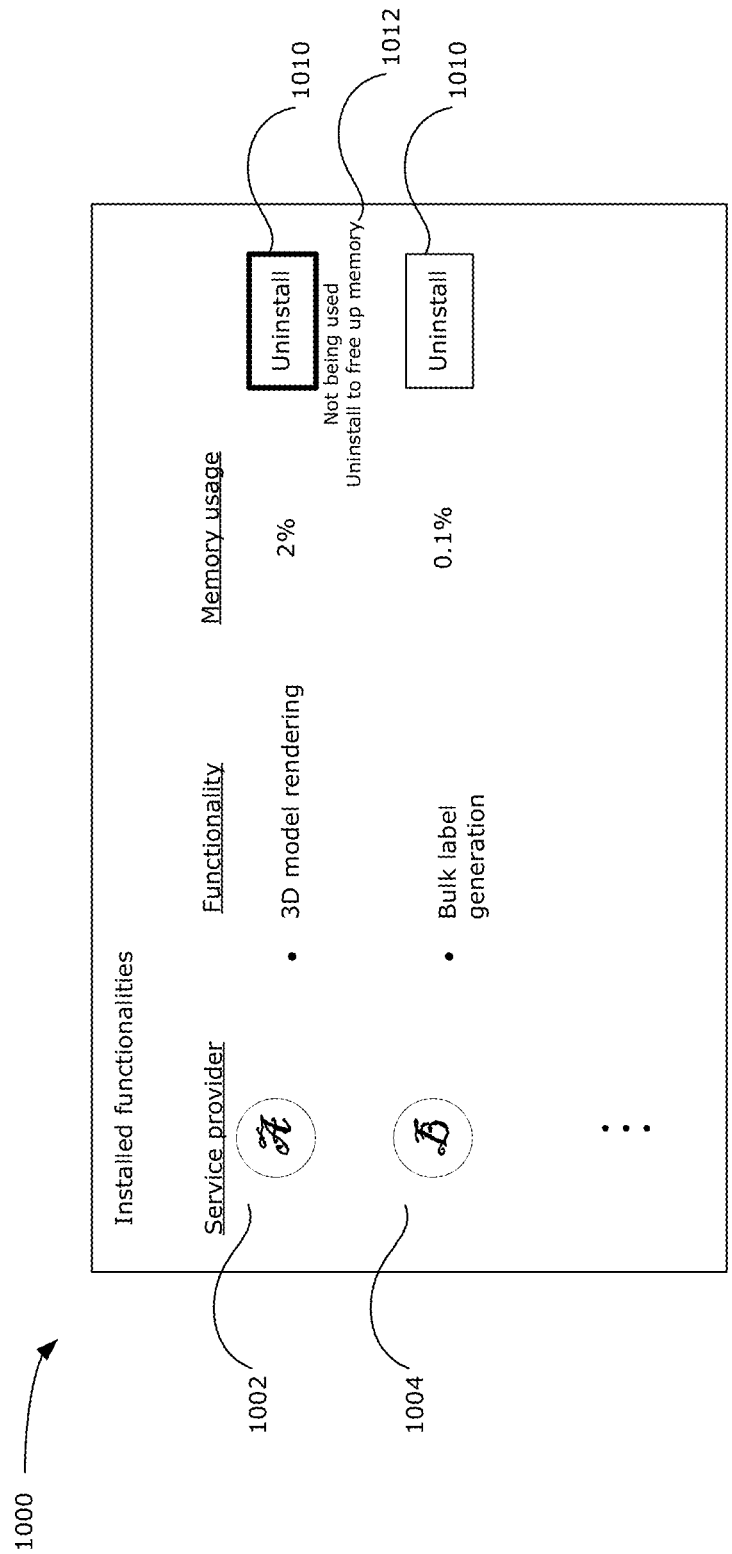
FIG. 10 illustrates an example user interface that may be used to uninstall an application from a service instance for an online store.

In some examples, the notification may be provided in the form of a UI (e.g., as shown in FIG. 10, discussed further below) that provides uninstallation options for applications installed against the service instance 302 for the online store 138. The UI may include the notification that the identified functionality is recommended or required to be uninstalled.

At operation 908, the software application providing the identified functionality is also identified (e.g., from the application register 312). The software application may be a first-party application or a third-party application, and the software application comprises instructions configured to provide the identified functionality.

At operation 910, the identified software application is uninstalled against the service instance 302 for the online store 138. The application installations register 316 is also updated to remove the identified software application for the service instance 302 of the online store 138. After the software application has been uninstalled, the corresponding functionality is disabled for the online store 138.

As discussed above, a UI may be provided to enable a merchant to view currently installed functionalities for a service instance 302 of an online store 138. The UI may also provide a notification (e.g., the notification generated at step 906 described above) that uninstallation is recommended or required.

FIG. 10 illustrates an example UI 1000 that may be used to manage the settings and configuration data 318 associated with a service instance 302, in particular in the example where the service instance 302 is an online store 138 hosted by the e-commerce platform 100. The UI 1000 may be generated by the e-commerce platform 100 to be presented on a merchant device 102, for example. The example UI 1000 may be presented as a dashboard that is accessible via a home page 170 of an administrator 114 (e.g., see FIG. 2), for example.

The example UI 1000 includes a table of functionalities currently installed against the online store 138. Each entry 1002, 1004 in the table includes information for a respective functionality, including identification of the service provider, a description of the functionality, indication of the amount of resources (e.g., memory usage, runtime, etc.) used by the functionality, and an option 1010 to uninstall the functionality. In particular, in the entry 1002 for the 3D model rendering functionality, a recommendation 1012 is included. The recommendation 1012 indicates that uninstallation of the 3D model rendering functionality is recommended, and further provides a reason for the recommendation (e.g., to free up resources and/or is not used or only rarely used). The option 1010 to uninstall the functionality may be highlighted in the entry 1002, to emphasize that uninstallation is recommended. In some examples, a functionality that is required for functioning of the online store 138, or first-party applications that are required by the e-commerce platform 100 may be omitted or hidden from the listed entries, or the uninstall option 1010 may be unavailable (e.g., hidden or grayed-out).

The greater the number of applications that are installed and running for all service instances 302 hosted on the e-commerce platform 100, the greater the total use of resources available on the platform 100. By enabling automatic identification of candidates for uninstallation and automatic installation of identified applications, the examples described above may help to release resources and thus help to improvement performance (e.g., speed) of the e-commerce platform 100 (and by extension improvement in performance of all service instances 302 on the e-commerce platform 100).

The above examples describe some store events or merchant actions that may trigger automatic installation of applications against a service instance 302 for an online store 138. Some other events that may trigger automatic installation are now described briefly.

For example, an application providing a functionality related to a POS device may be automatically installed after the POS device is first registered against the online store 138. The registration of the POS device may be detected by the applications manager 304, for example, based on the configuration data 318 associated with the online store 138.

In another example, the applications manager 304 may determine, from the operational data 319, that the merchant associated with the online store 138 has setup a new warehouse serving the store in a country having specific labeling requirements. The applications manager 304 may thus identify the requirement for a new label generation functionality and may automatically install the software application to provide the label generation functionality.

Accordingly, some examples of the present disclosure may enable automatic installation of applications to provide functionalities in a seamless and transparent way. In some examples, applications may be installed (and associated functionalities enabled) for an online store without the merchant being aware of the installation, or even aware of the need for the installation.

In some examples, the defined criteria used by the applications manager 304 may enable automatic installation of applications in anticipation of a needed functionality, ahead of the functionality being actually needed. For example, the applications manager 304 may determine, based on historical sales trends (e.g., from the operational data 319 associated with an online store 138) that the online store 138 is expected to soon (e.g., within the next week) reach a threshold sales level at which bulk shipping is recommended. Accordingly, the applications manager 304 may automatically install (or generate a recommendation to install) an application to provide bulk shipping functionalities.

In various examples, the present disclosure has described methods and systems that enable automatic installation (or uninstallation) of applications against a service instance. The installation (or uninstallation) may take place entirely in the background and with little or no human interaction, thus providing a seamless and transparent experience for a user.

The installation (or uninstallation) of applications may enable functionalities to be tailored to the specific needs of each service instance, thus enabling more efficient use of resources on the platform. The installation (or uninstallation) of applications may future be tailored based on expected future use (or non-use) by the service instance, in some examples.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A system comprising:
a processor in communication with storage, the processor configured to execute instructions from the storage to cause the system to:
detect a first change in status of a service instance for an online store from a first status to a second status, wherein in the first status, a first set of one or more functionalities is accessible by the service instance via extension points, and wherein in the second status, a second set of one or more functionalities is applicable to the service instance, the second set of one or more functionalities including an additional functionality that is absent from the first set of one or more functionalities, the first set of one or more functionalities corresponding to core functionality and to functionality provided by software applications and associated extension points currently installed against the service instance;
responsive to detecting the first change in status of the service instance, identify the additional functionality that is absent from the first set of one or more functionalities;
automatically identify, from an application register comprising a plurality of applications, a software application providing the identified additional functionality via an associated extension point, the identified software application being one of the plurality of applications other than the software applications currently installed against the service instance and comprising instructions for providing the identified additional functionality via the associated extension point; and
automatically install the identified software application and configure the associated extension point against the service instance, to enable the identified additional functionality for the online store.

2. The system of claim 1, wherein the first change in status is detected based on a change in a setting of the online store from the first status to the second status.

3. The system of claim 1, wherein the processor is configured to execute instructions to cause the system to detect the first change in status by:
detecting an update to configuration data associated with the online store.

4. The system of claim 3, wherein the identified additional functionality is further identified as being required to implement a change associated with the update to the configuration data associated with the online store.

5. The system of claim 1, wherein the processor is configured to execute instructions to cause the system to detect the first change in status by:
tracking operational data associated with the online store; and
detecting the first change in status conditioned on the operational data satisfying a defined criteria for the second status.

6. The system of claim 5, wherein satisfying the defined criteria is a prerequisite for the online store to qualify for the identified additional functionality.

7. The system of claim 1, wherein the processor is configured to execute instructions to further cause the system to:
detect a second change in status of the service instance for the online store from the second status to a third status;
determine that the identified additional functionality associated with the second status is not required in the third status; and
uninstall the identified software application to disable the identified additional functionality from the online store.

8. The system of claim 7, wherein the processor is configured to execute instructions to further cause the system to:
provide a user-selectable option to select the identified additional functionality for uninstallation; and
uninstall the identified software application in response to selection of the option.

9. The system of claim 1, wherein the processor is configured to execute instructions to cause the system to automatically install the software application by:
communicating a request for the software application to a third-party system;
receiving the software application from the third-party system; and
installing the software application received from the third-party system.

10. A method comprising:
detecting a first change in status of a service instance for an online store from a first status to a second status, wherein in the first status a first set of one or more functionalities is accessible by the service instance via extension points, and wherein in the second status a second set of one or more functionalities is applicable to the service instance, the second set of one or more functionalities including an additional functionality that is absent from the first set of one or more functionalities, the first set of one or more functionalities corresponding to core functionality and to functionality provided by software applications and associated extension points currently installed against the service instance;
responsive to detecting the first change in status of the service instance, identifying the additional functionality that is absent from the first set of one or more functionalities;
automatically identifying, from an application register comprising a plurality of applications, a software application providing the identified additional functionality via an associated extension point, the identified software application being one of the plurality of applications other than the software applications currently installed against the service instance and comprising instructions for providing the identified additional functionality via the associated extension point; and automatically installing the identified software application and configuring the associated extension point against the service instance, to enable the identified additional functionality for the online store.

11. The method of claim 10, wherein the first change in status is detected based on a change in a setting of the online store from the first status to the second status.

12. The method of claim 10, wherein detecting the first change in status comprises:
detecting an update to configuration data associated with the online store.

13. The method of claim 12, wherein the identified additional functionality is further identified as being required to implement a change associated with the update to the configuration data associated with the online store.

14. The method of claim 10, wherein detecting the first change in status comprises:
tracking operational data associated with the online store; and
detecting the first change in status conditioned on the operational data satisfying a defined criteria for the second status.

15. The method of claim 14, wherein satisfying the defined criteria is a prerequisite for the online store to qualify for the identified additional functionality.

16. The method of claim 10, further comprising:
detecting a second change in status of the service instance for the online store from the second status to a third status;
determining that the identified additional functionality associated with the second status is not required in the third status; and
uninstalling the identified software application to disable the identified additional functionality from the online store.

17. The method of claim 16, further comprising:
providing a user-selectable option to select the identified additional functionality for uninstallation; and
uninstalling the identified software application in response to selection of the option.

18. The method of claim 10, wherein automatically installing the software application comprises:
communicating a request for the software application to a third-party system;
receiving the software application from the third-party system; and
installing the software application received from the third-party system.

19. A non-transitory computer-readable medium storing instructions that, when executed by a processor of a system, cause the system to:
detect a first change in status of a service instance for an online store from a first status to a second status, wherein in the first status a first set of one or more functionalities is accessible by the service instance via extension points, and wherein in the second status a second set of one or more functionalities is applicable to the service instance, the second set of one or more functionalities including an additional functionality that is absent from the first set of one or more functionalities, the first set of one or more functionalities corresponding to core functionality and to functionality provided by software applications and associated extension points currently installed against the service instance;
responsive to detecting the first change in status of the service instance, identify the additional functionality that is absent from the first set of one or more functionalities;
automatically identify, from an application register comprising a plurality of applications, a software application providing the identified additional functionality via an associated extension point, the identified software application being one of the plurality of applications other than the software applications currently installed against the service instance and comprising instructions for providing the identified additional functionality via the associated extension point; and
automatically install the identified software application and configure the associated extension point against the service instance, to enable the identified additional functionality for the online store.

20. The non-transitory computer-readable medium of claim 19, wherein the instructions further cause the system to detect the first change in status by:
tracking operational data associated with the online store; and
detecting the first change in status conditioned on the operational data satisfying a defined criteria for the second status.

* * * * *